(No Model.)
L. ROLL.
CAR WHEEL.
No. 513,623.
Patented Jan. 30, 1894.
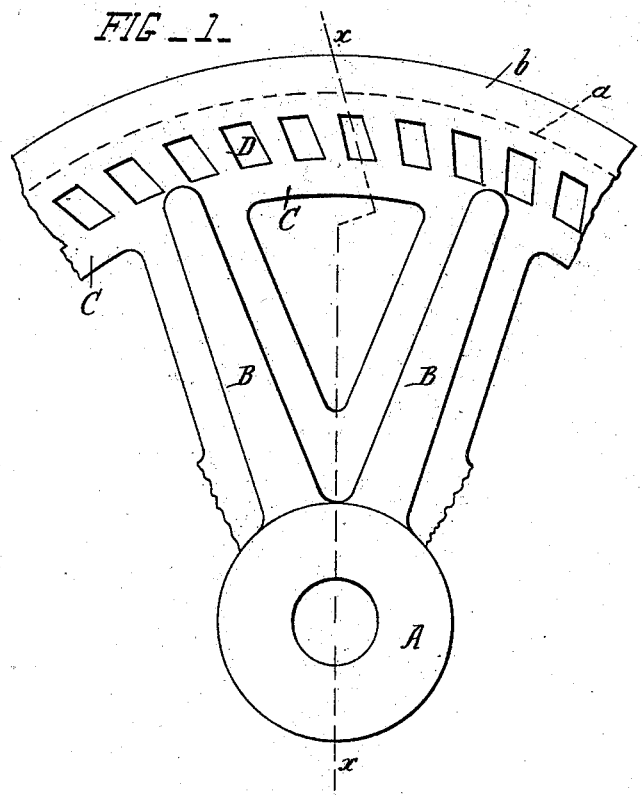
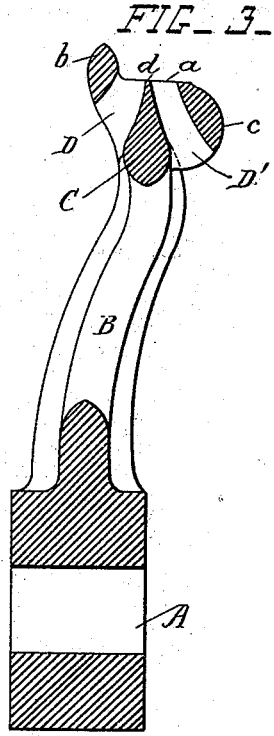
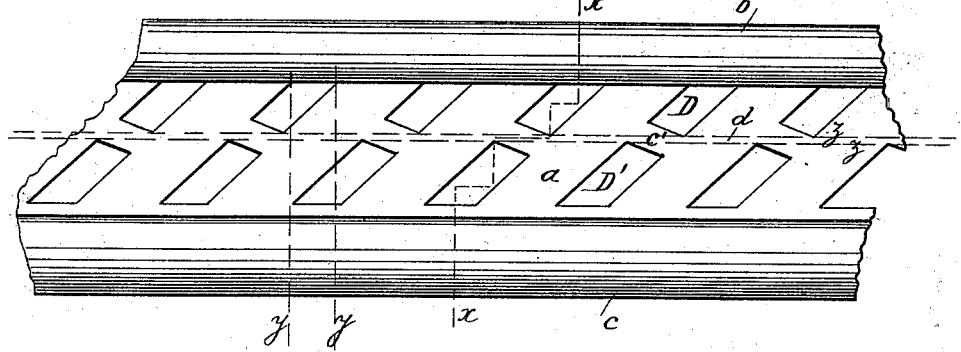
WITNESSES:
Walter Allen
J. W. Pfister
INVENTOR
Leonard Roll
BY Herbert W. T. Jenner.
ATTORNEY.

UNITED STATES PATENT OFFICE.

LEONARD ROLL, OF WILKES-BARRÉ, PENNSYLVANIA.

CAR-WHEEL.

SPECIFICATION forming part of Letters Patent No. 513,623, dated January 30, 1894.

Application filed May 5, 1893. Serial No. 473,093. (No model.)

*To all whom it may concern:*

Be it known that I, LEONARD ROLL, a citizen of the United States, residing at Wilkes-Barré, in the county of Luzerne and State of Pennsylvania, have invented certain new and useful Improvements in Car-Wheels; and I do hereby declare the following to be a full, clear, and exact description of the invention, such as will enable others skilled in the art to which it appertains to make and use the same.

This invention relates to car wheels; and it consists in the novel construction and combination of the parts hereinafter fully described and claimed, whereby the rails are kept clear of snow and ice.

In the drawings: Figure 1 is a front view of a portion of a car wheel constructed according to this invention. Fig. 2 is a plan view of a part of the tread of the wheel shown flattened out and drawn to a larger scale. Fig. 3 is a section through the wheel, taken on the line $x\ x$ in Figs. 1 and 2.

The wheel is provided with a tread $a$, and a flange $b$ in the ordinary manner.

A is the hub, and B are the arms which may be of any approved number and cross-section. The outer ends of the arms join onto the tread at about the middle of its width, and C is a rib which joins the tops of the arms and extends around the inside of the periphery of the tread. A curved projection $c$ is formed upon the side of tread for the purpose of pushing stones out of the way which lie adjacent to the rail and which would otherwise cause a jar or shock when struck by the tread. This projection also strengthens the wheel. The tread is provided with a double series of inclined oblong holes D and D' which extend clear through it. These holes are curved laterally in opposite directions and have their outlet openings of greater area than the openings in the tread.

The rib C projects upward between the holes D and D' which are arranged in line with each other and at the same angle, and the top of the rib forms a bar $c'$ between the adjacent ends of the holes. The inclination of the holes and the width of the bar $c'$ are arranged so that a very narrow unbroken surface $d$ is formed around the periphery of the tread, as indicated by the dotted lines $z\ z$ in Fig. 2. This surface $d$ is arranged at that part of the tread which bears on the rail, and its function is to insure the smooth running of the wheel without any jolt or jar.

The edges of the holes D and D' break up the snow and ice on the rail and throw it off at the sides of the rail as the wheel revolves.

The surface $d$ is made as narrow as possible, so that the corners at the adjacent ends of the holes may scrape the rail as much as possible. The inclination of the holes is such that the ends of the holes next to the flange are substantially opposite the ends of the holes next to the projection $c$, as indicated by the dotted lines $y\ y$ in Fig. 2. This insures the best cleaning action with the smoothest running.

What I claim is—

1. A car wheel having a double series of inclined oblong holes extending through its tread, and a circumferential rib extending upwardly between the adjacent ends of the holes and forming a narrow continuous bearing surface, substantially as set forth.

2. A car wheel having a double series of inclined oblong holes extending through its tread, said holes being arranged longitudinally in line with each other and curved outwardly in opposite directions, and a circumferential rib extending upwardly between the adjacent ends of the holes, substantially as set forth.

In testimony whereof I affix my signature in presence of two witnesses.

LEONARD ROLL.

Witnesses:
HENRY L. MORSE,
F. LOUIS HELFRICH.